(12) United States Patent
Ueno et al.

(10) Patent No.: US 7,608,371 B2
(45) Date of Patent: Oct. 27, 2009

(54) METHOD OF MODIFYING LIQUID CRYSTAL POLYMERS

(75) Inventors: Ryuzo Ueno, Nishinomiya (JP); Kunikazu Asaka, Tokyo-to (JP); Kazuyuki Hirao, Kyoto-fu (JP); Shingo Kanehira, Higashiosaka (JP); Masaya Kitayama, Takarazuka (JP)

(73) Assignee: LEF Technology, Inc., Tokyo (JP)

( * ) Notice: Subject to any disclaimer, the term of this patent is extended or adjusted under 35 U.S.C. 154(b) by 0 days.

(21) Appl. No.: 12/223,695

(22) PCT Filed: Jan. 31, 2007

(86) PCT No.: PCT/JP2007/051612

§ 371 (c)(1),
(2), (4) Date: Oct. 10, 2008

(87) PCT Pub. No.: WO2007/091466

PCT Pub. Date: Aug. 16, 2007

(65) Prior Publication Data

US 2009/0048362 A1    Feb. 19, 2009

(30) Foreign Application Priority Data

Feb. 10, 2006    (JP)    ............... 2006-033899

(51) Int. Cl.
*C08J 3/28*    (2006.01)
*C08J 7/18*    (2006.01)
*C09K 19/00*    (2006.01)
*G02F 1/03*    (2006.01)

(52) U.S. Cl. .............. 430/20; 522/2; 522/165; 528/308; 528/308.6

(58) Field of Classification Search ............... 522/2; 428/1.1–1.62; 430/20; 528/308, 308.6
See application file for complete search history.

(56) References Cited

U.S. PATENT DOCUMENTS

| 6,207,240 | B1 | 3/2001 | Schoenfeld et al. |
| 7,130,517 | B2* | 10/2006 | Garito et al. ............... 385/129 |
| 7,356,240 | B2* | 4/2008 | Adachi et al. ............... 385/147 |
| 2002/0117624 | A1 | 8/2002 | Katayama et al. |
| 2006/0171656 | A1 | 8/2006 | Adachi et al. |
| 2008/0044637 | A1* | 2/2008 | Masuda et al. ............ 428/220 |
| 2008/0095968 | A1* | 4/2008 | Semon ..................... 428/66.1 |
| 2008/0253411 | A1* | 10/2008 | McPhail et al. ............. 372/26 |

FOREIGN PATENT DOCUMENTS

| JP | 9-136968 | 5/1997 |
| JP | 2000-80180 | 3/2000 |
| JP | 2001-192847 | 7/2001 |
| JP | 2001-200370 | 7/2001 |
| JP | 2002-249607 | 9/2002 |
| JP | 2003-136273 | 5/2003 |
| JP | 2004-8881 | 1/2004 |
| JP | 2004-324017 | 11/2004 |
| JP | 2005-85554 | 3/2005 |
| WO | 2005/026238 | 3/2005 |

* cited by examiner

*Primary Examiner*—Susan W Berman
(74) *Attorney, Agent, or Firm*—Wenderoth, Lind & Ponack L.L.P.

(57) ABSTRACT

A method of modifying liquid crystal polymers, which involves a step of irradiating a liquid crystal polymer with the laser beam having a pulse width of $10^{-12}$ seconds or less. Using the invention method, the physical strength of the liquid crystal polymers can be improved as compared with the conventional liquid crystal polymers.

18 Claims, 11 Drawing Sheets

[Fig. 1]
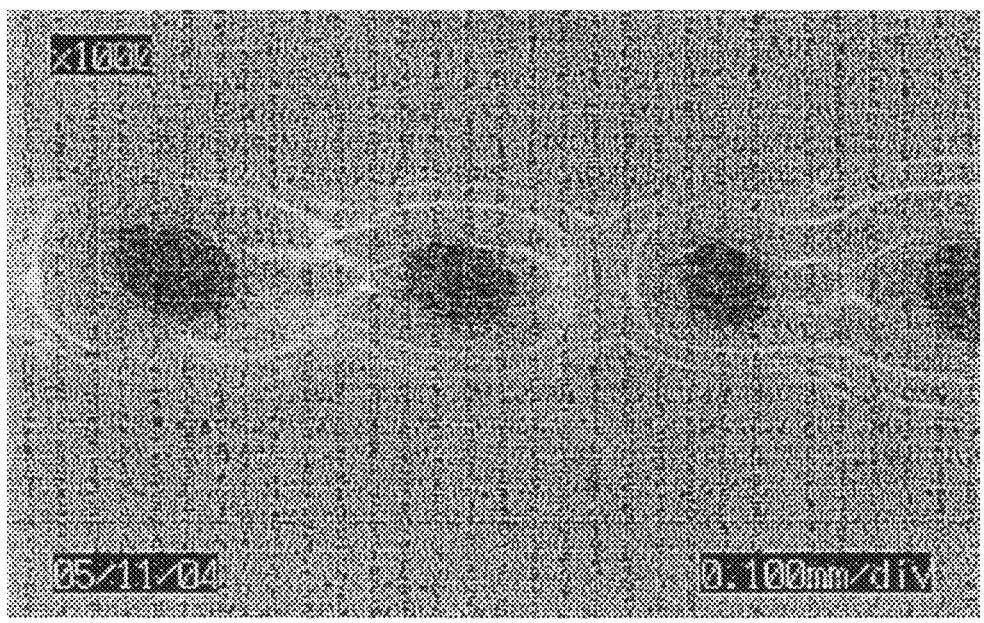

[Fig. 2]
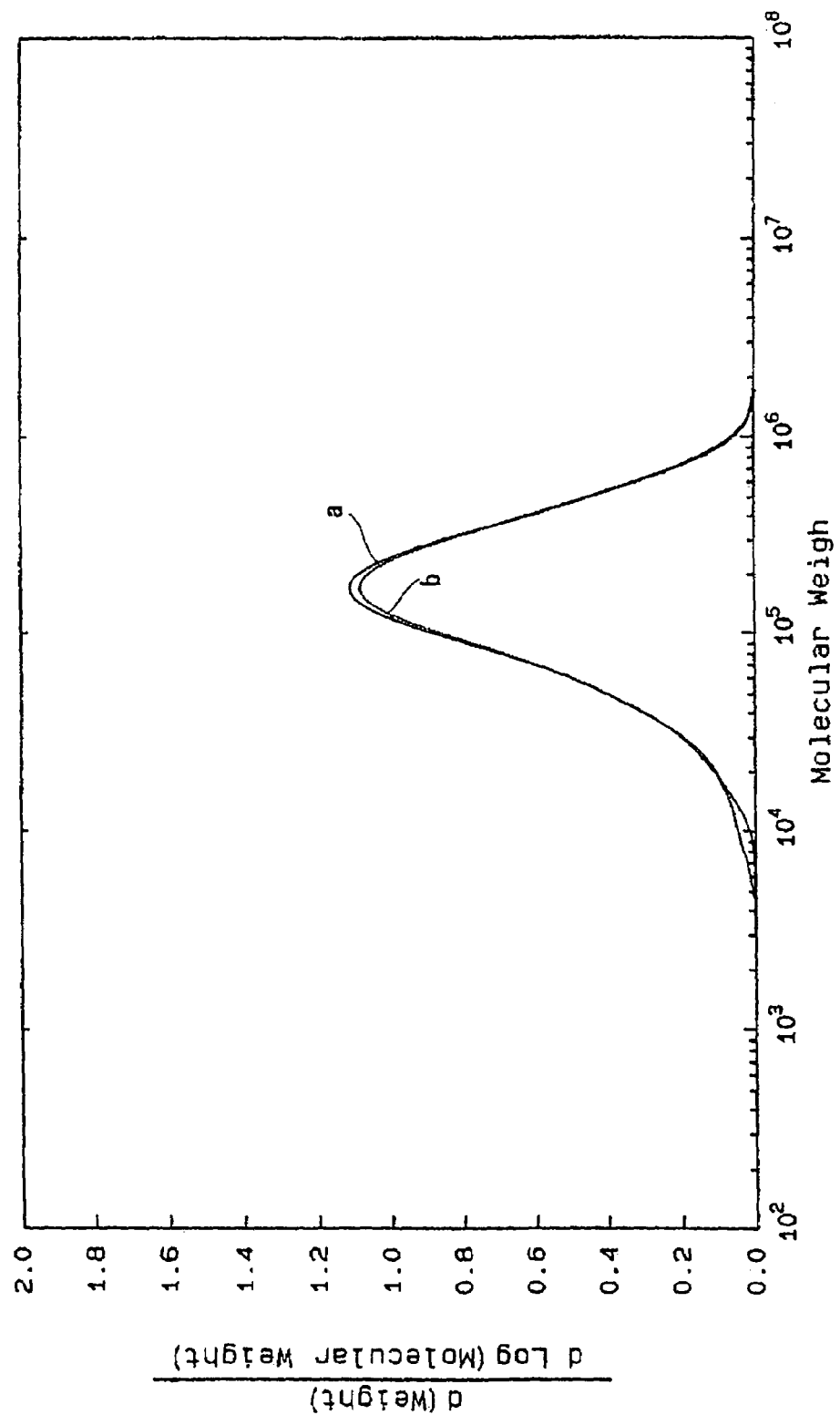

[Fig. 3]
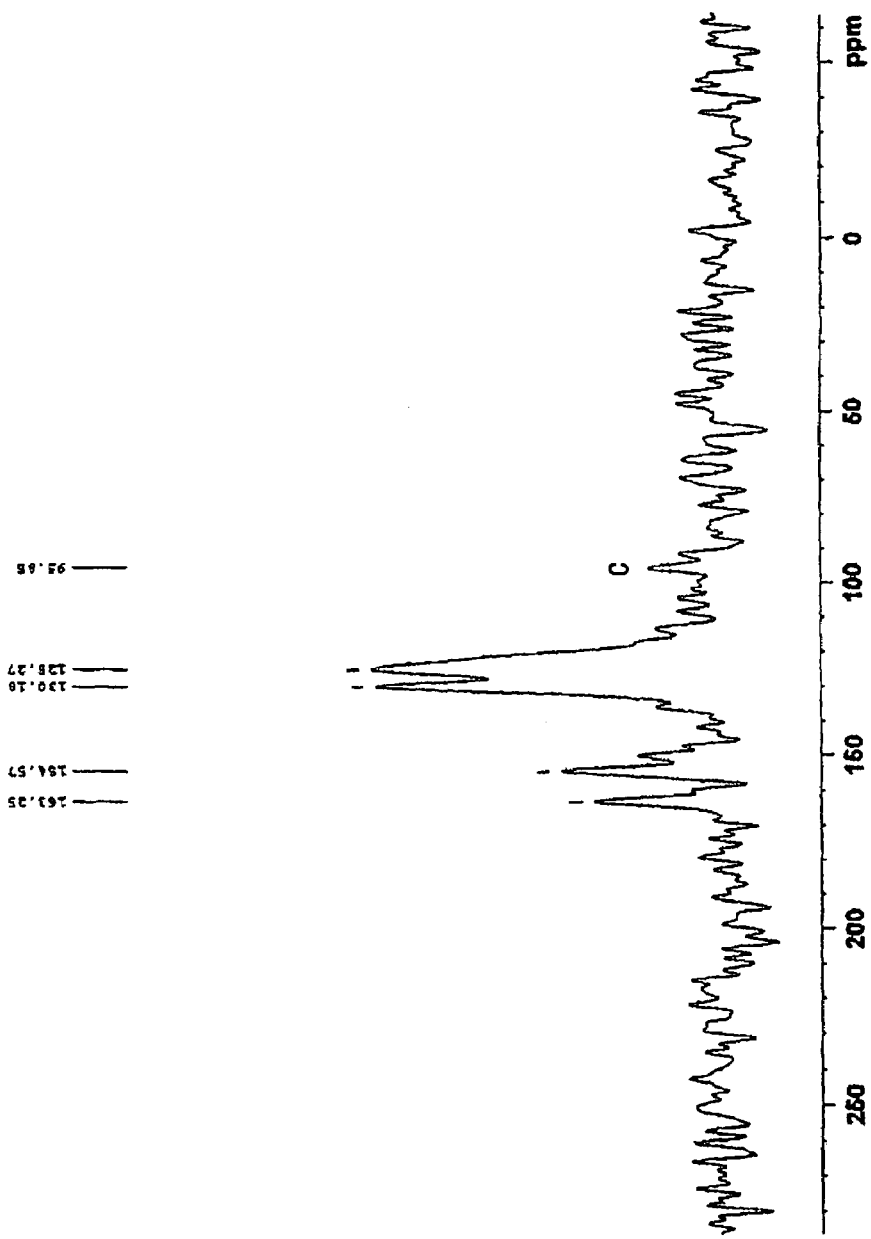

[Fig. 4]
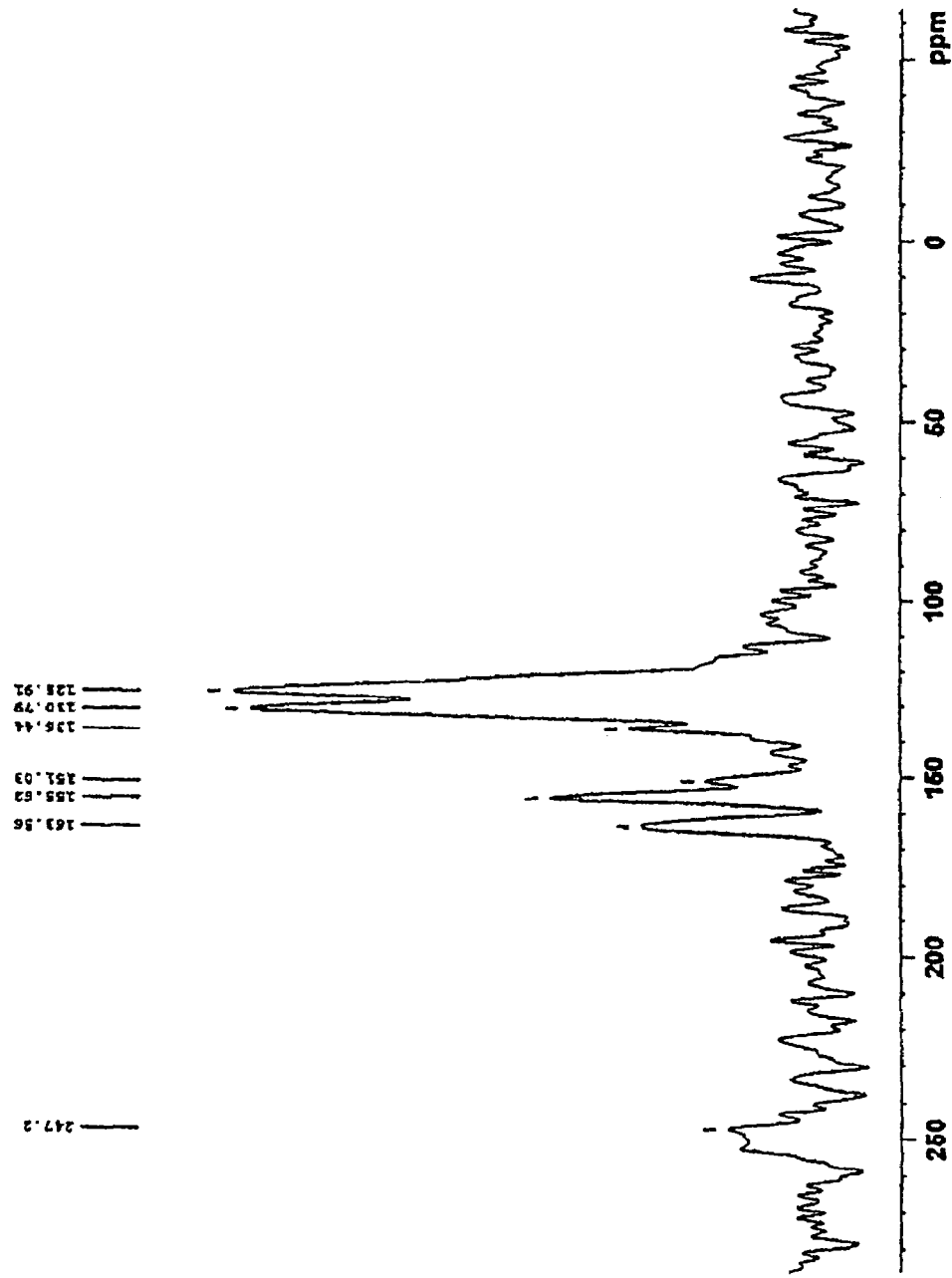

[Fig. 5]
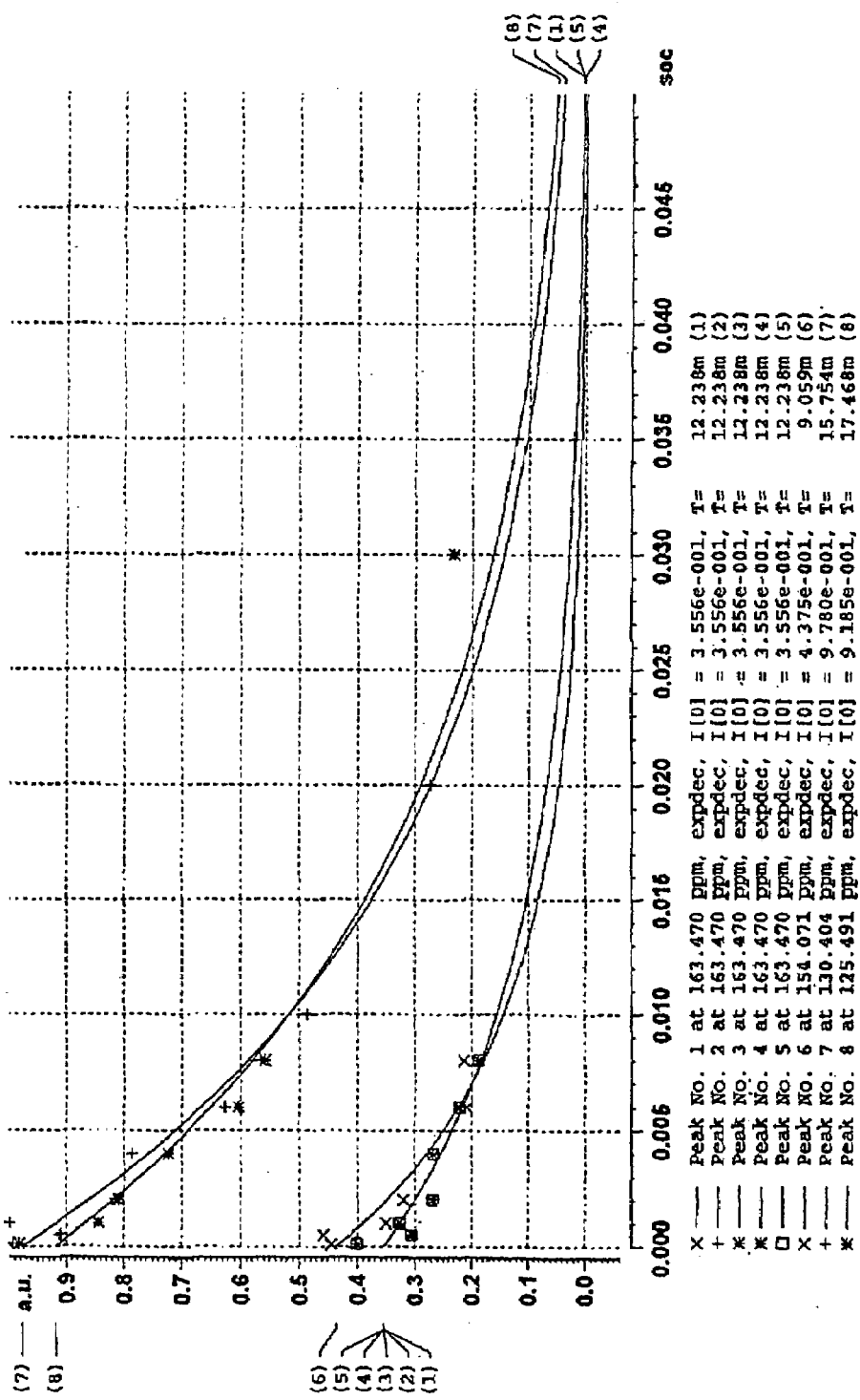

[Fig. 6]
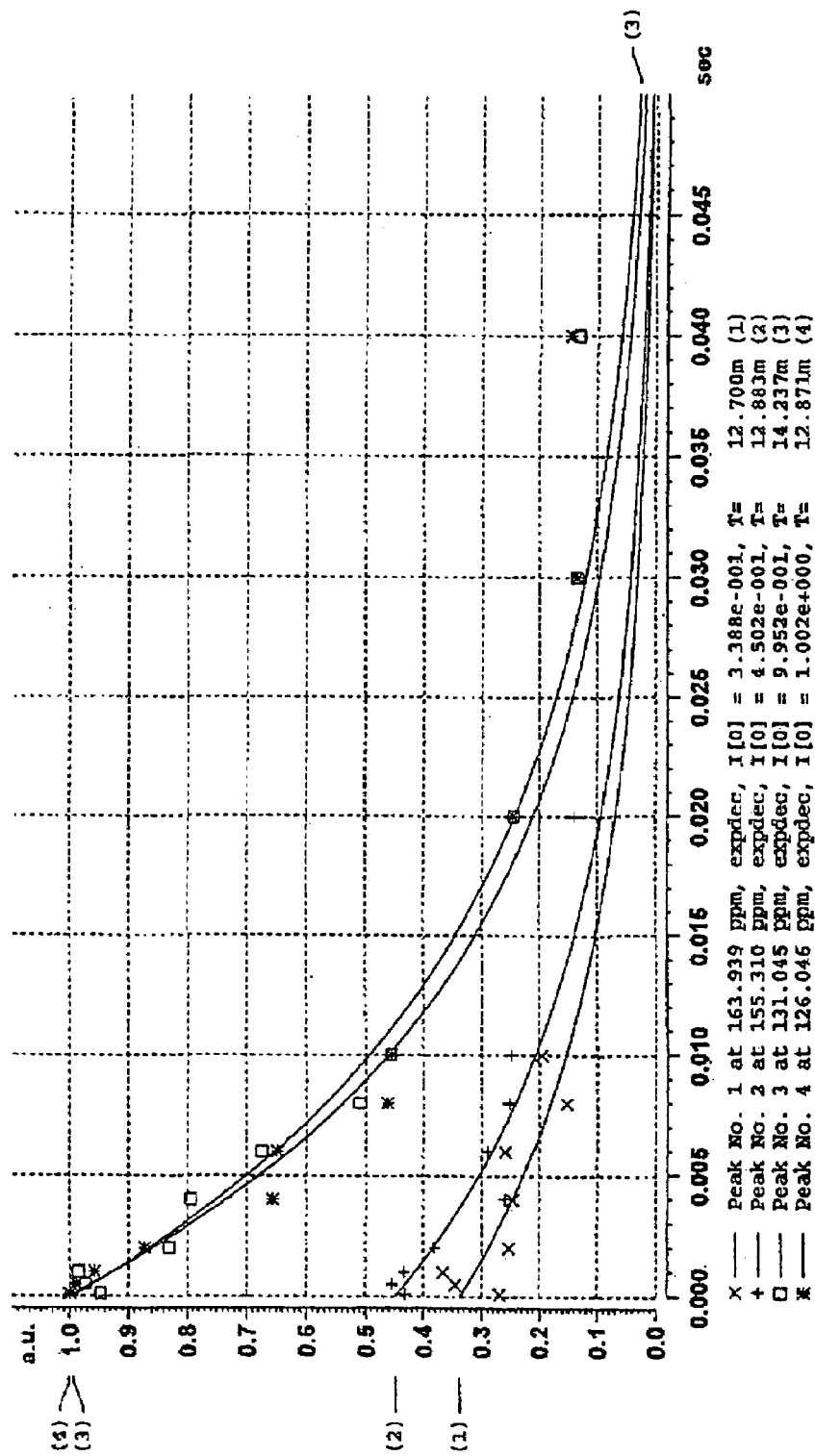

[Fig. 7]
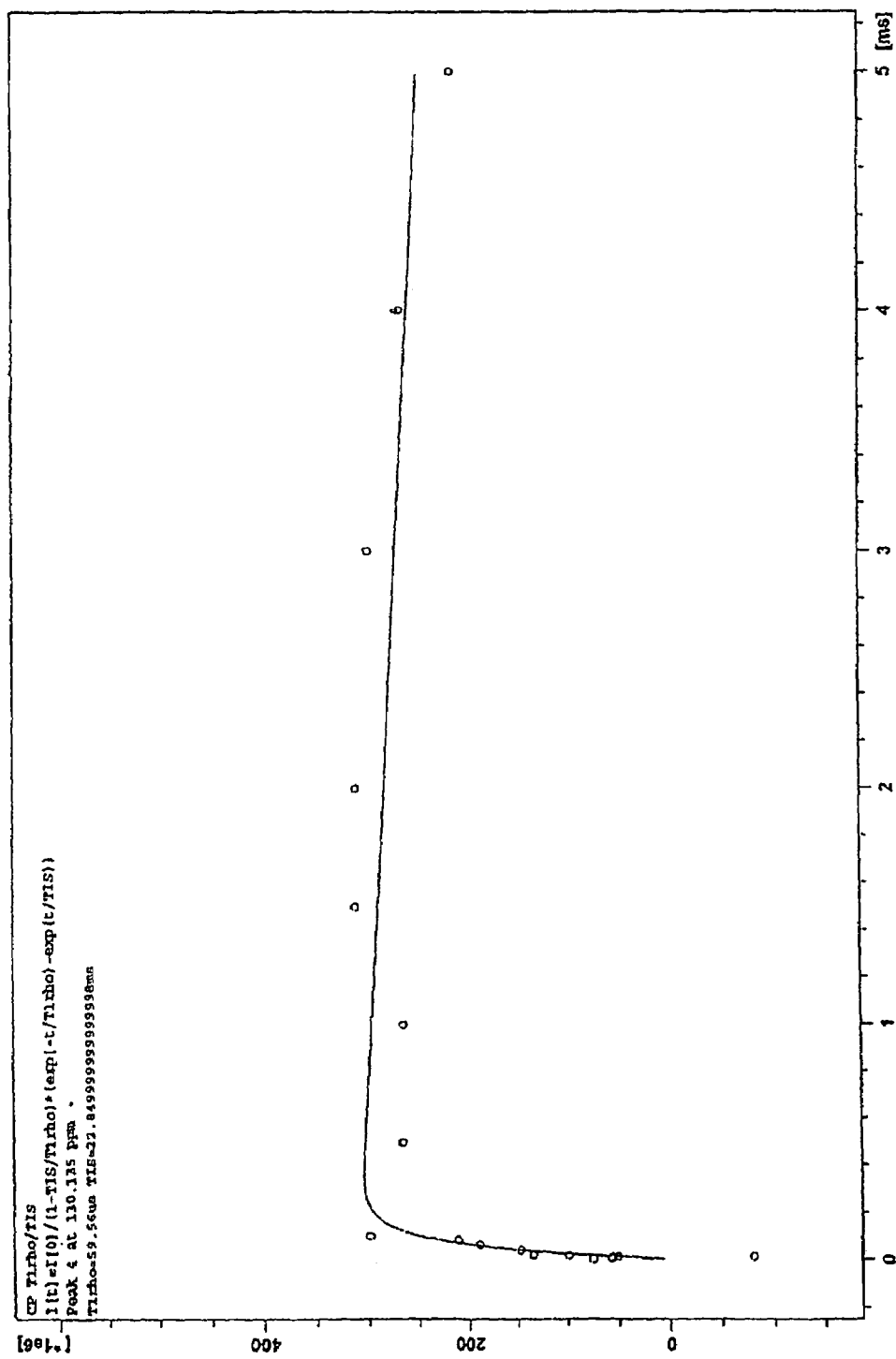

[Fig. 8]
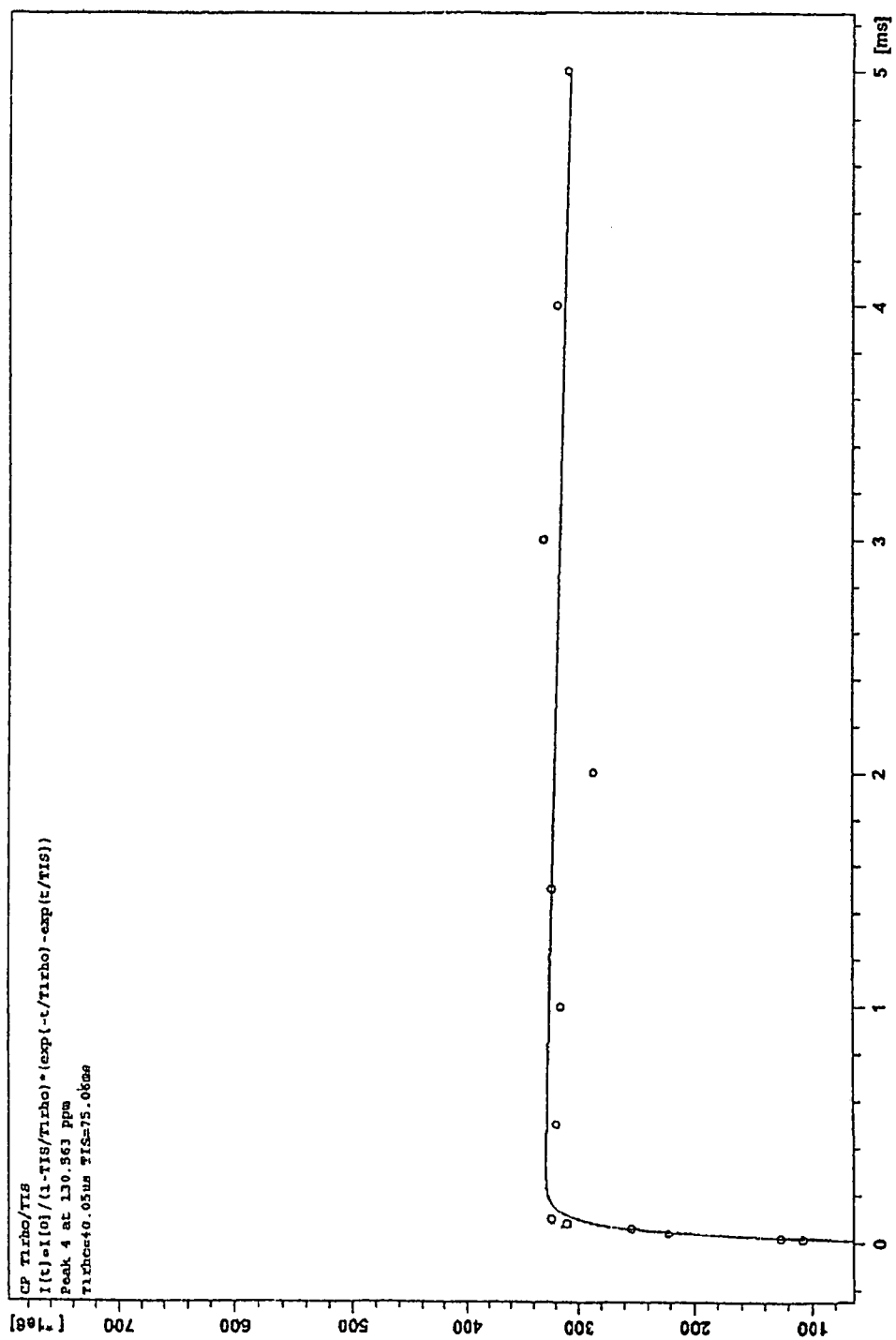

[Fig. 9]
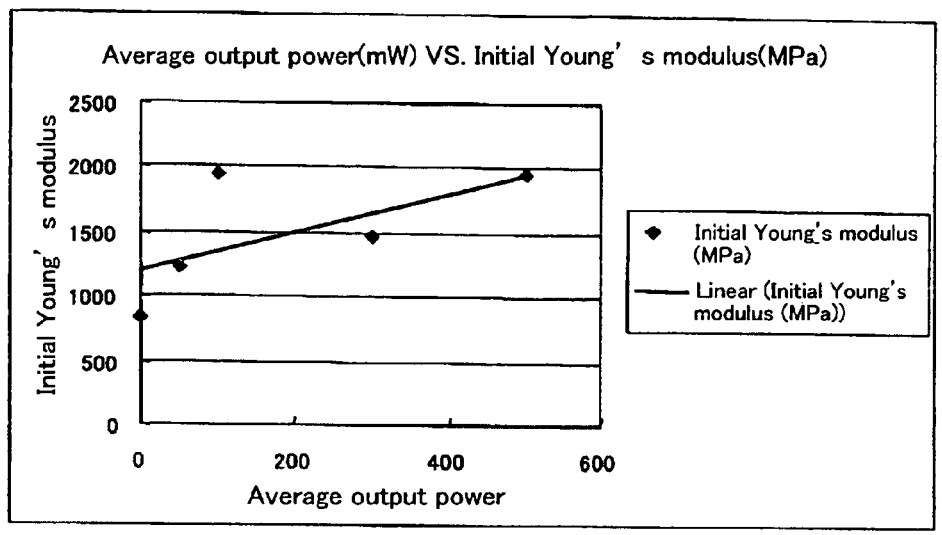
[Fig. 10]
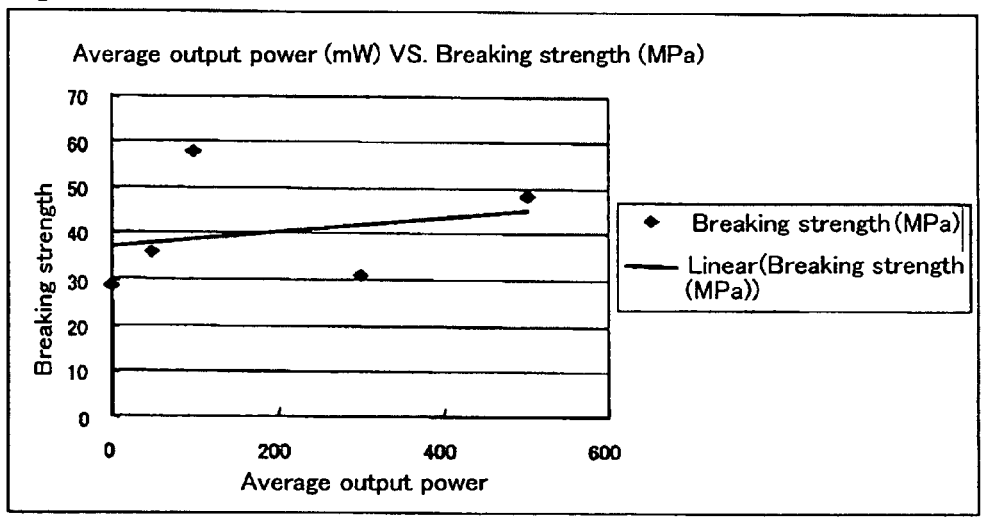

[Fig. 11]
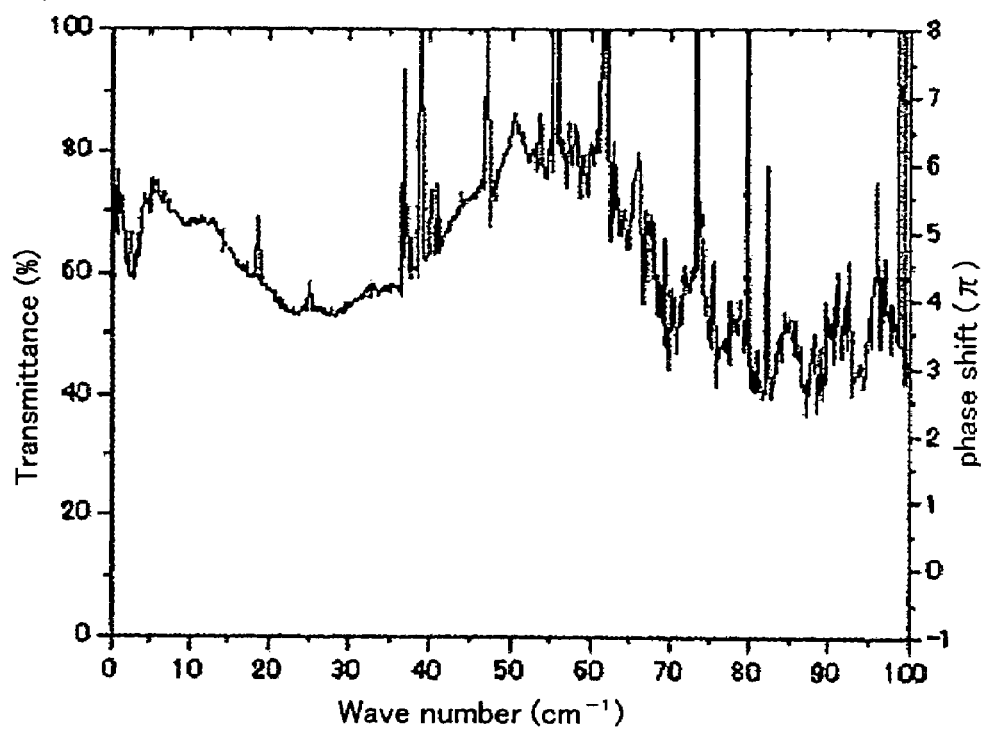

[Fig. 12]
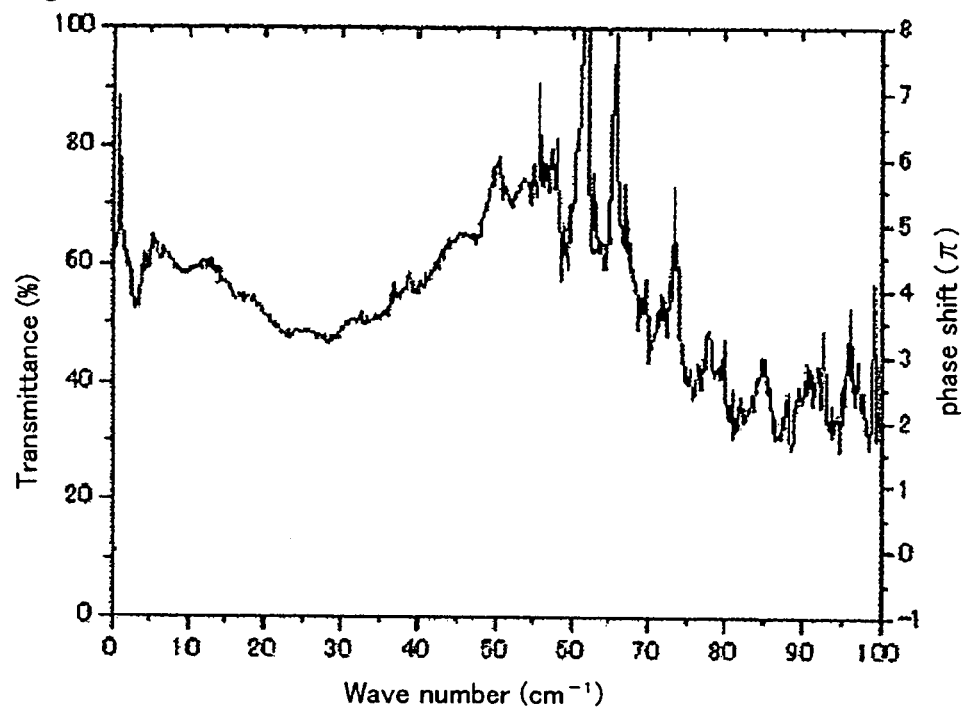

METHOD OF MODIFYING LIQUID CRYSTAL POLYMERS

This application is a U.S. national stage of International Application No. PCT/JP2007/051612 filed Jan. 31, 2007.

1. Technical Field

The present invention relates to methods of modifying liquid crystal polymers.

2. Background Art

Liquid crystal polymers (LCP) are few in molecular entanglement in liquid state, molecules thereof align along one direction when a shear force is applied to, and solidify with the molecules oriented when they are cooled, so high strength and high elastic modulus is obtained. For example, wholly aromatic polyamide is known as fibers, films and the like having high strength, high elastic modulus and excellent heat resistance. However, this is the solution-type liquid crystal polymer which dissolves in a solvent to form liquid crystal. This type involves a disadvantage that fibers, films and the like have to be formed from the wet process using solvent.

On the other hand, wholly aromatic polyester is the melt-type liquid crystal polymer, which forms liquid crystal in a molten state. This type of liquid crystal polymer has a great advantage of melt-forming such that it can be formed in a molten state. However, viscosity in molten state has to be kept low, and therefore polymerization degree is not increased sufficiently before forming. Improvement in physical strength is thus limited by comparison with solution-type liquid crystal polymer. It is although known a method of increasing polymerization degree by performing solid polymerization after forming, it requires high-temperature treatment under vacuum, resulting in high production cost.

Femtosecond lasers are generally defined as lasers having a beam with pulse width of from several femtoseconds to several hundreds femtoseconds. Femtosecond lasers have a very short pulse width, and a beam pulse is confined in an extremely short time such as about $10^{-15}$ seconds, and exhibit high maximum power in one pulse. When such the laser beam of an ultra-high-strength and ultra-short pulse laser is focused in irradiation, energy is injected instantly to an object before heat conduction occurs. Therefore, peripheral area of the irradiated site is hardly damaged, and it is used mainly in the applications of microprocessing.

Patent document 1 discloses a method of melt-spinning polyesters, in which a polyester extruded from a spinneret is irradiated with a laser at a predetermined energy density. In this method, laser irradiation is used as heating means for making fiber thinner by increasing temperature of the fiber after extruding. On the other hand, the spinning temperature is kept relatively low to prevent thermal decomposition of polyester, and drawing ratio of fibers is improved.

Patent document 2 discloses that a polymer material is irradiated with an ultra-short pulse laser to change orientation direction of the polymer. Patent document 3 discloses that a plastic material is irradiated with an ultra-short pulse laser to change the plastic structure. In these methods, it has been confirmed that optical properties of polymers, such as orientation or refractive index of liquid crystals changed.

No attempt has heretofore been made to change molecular structure, polymerization degree, molecular weight distribution and the like of a polymer by injecting energy instantly to the polymer while inhibiting thermal damage. Since liquid crystal polymers are excellent in orientation of molecules, it is expected a substantial structural change which provides improvement in physical or chemical properties when a liquid crystal polymer is used as an object to which the energy is injected.

[Patent document 1] Japanese Patent Laid-open Publication No. 2004-324017
[Patent document 2] Japanese Patent Laid-open Publication No. 2003-253019
[Patent document 3] Japanese Patent Laid-open Publication No. 2004-8881

DISCLOSURE OF THE INVENTION

Problems to be Solved by the Invention

The present invention was made in order to solve the problems of the conventional technologies, and the objective thereof is to provide a method for modifying a liquid crystal polymer by which physical properties (e.g., mechanical strength) can be improved in comparison to those of conventional liquid crystal polymers.

Means for Solving the Problem

The present invention provides a method of modifying liquid crystal polymers, which comprises a step of irradiating a liquid crystal polymer with the laser beam having a pulse width of $10^{-12}$ seconds or less. The aforementioned objective is able to be achieved thereby.

Effect of the Invention

The modified liquid crystal polymers of the present invention (particularly, of the melt-type) are substantially improved in polymerization degree in comparison to conventional liquid crystal polymers and are expected to have crosslinked structures. It has been recognized that appropriate increase in irradiation strength leads to improvement in tensile strength and elastic modulus. In this specification, the term "irradiation strength" has the same meaning as "average output power."

Based on this fact, it is conceivable that in a spinning process of liquid crystal polymer fiberization, irradiating polymer in a molten state before being extruded through a spinning nozzle or irradiating fibers in a molten or semi-molten state after being extruded from the nozzle outlet, with an ultra short pulse laser in optimized irradiation conditions, increases polymerization degree and improves physical strength through utilization of the nonthermal photochemical reaction. This method is advantageous in that it does not require a process for increasing polymerization degree by performing solid phase polymerization with heat treatment after spinning, that is, a high-temperature treating process under vacuum as in the conventional methods.

The modified liquid crystal polymer fibers have a possibility to show improvement in tensile breaking strength and initial Young's modulus and also in bending strength and compressive elastic modulus. As applications of fibers having been improved in this property, for example, use of such fibers instead of steel cords to be used in carcass materials of radial tires for passenger cars, light trucks, and especially large trucks and buses makes it possible to further reduce weight of tires and accordingly improve performance and also improve durability (bending fatigue resistance).

Moreover, in a film forming process of liquid crystal polymer filming, it is conceivable that physical strength and strength uniformity in both the longitudinal direction and the transverse direction (the machine flow direction (MD) and the direction perpendicular thereto (TD)) are improved by optimally irradiating polymer in a molten state before being extruded through the die or irradiating a film in a molten or semi-molten state after being extruded from the die outlet.

Furthermore, this modification method has a possibility of imparting to conventional liquid crystal polymers a property of hardly allowing electromagnetic waves with a high frequency of terahertz ($10^{12}$ Hertz) range to pass therethrough, it is expected to produce new heat-resistant films excellent in high-frequency dielectric characteristics (low dielectric loss).

In addition, instead of utilizing a photochemical reaction caused by the ultra-short pulse laser, if a similar modification effect can be obtained by irradiating with optimally designed other types of laser or light source, it is expected that photo-conversion efficiency in the modification is further improved.

BEST MODE FOR CARRYING OUT THE INVENTION

The liquid crystal polymer to be modified may be any of the solution-type and the melt-type. However, the modification effect including improvement in polymerization degree and physical strength can be obtained remarkably for the melt-type liquid crystal polymers. The melt-type liquid crystal polymers are the polymers which form an anisotropic molten phase, and are called "thermotropic liquid crystal polymers" in the art.

Properties of the anisotropic molten phase can be confirmed by a conventional polarization test method with the use of orthogonal polarizers. More specifically, the anisotropic molten phase can be confirmed by using a Leitz polarizing microscope and observing a sample on a Leitz hot stage at a magnification of 40 under nitrogen atmosphere. The above-mentioned polymer is optically anisotropic. In other words, when the polymer is examined between orthogonal polarizers, the polarized light is allowed to pass. When a sample is optically anisotropic, polarized light passes through it even if it is in the static state.

The liquid crystal polymers specifically include liquid crystal polyester resins and liquid crystal polyester amides which form an anisotropic molten phase and which have, as constituting units, the monomer units selected from aromatic hydroxycarboxylic acids, aromatic dicarboxylic acids, aromatic diols, aromatic hydroxylamines, aromatic diamines, and aromatic aminocarboxylic acids, and in particular the monomer units selected from aromatic dicarboxylic acids, aromatic diols and aromatic hydroxycarboxylic acids.

Specific examples of the aromatic hydroxycarboxylic acids include aromatic hydroxycarboxylic acids such as 4-hydroxybenzoic acid, 2-hydroxy-3-naphthoic acid, 2-hydroxy-6-naphthoic acid, 2-hydroxy-7-naphthoic acid, 3-methyl-4-hydroxybenzoic acid, 3,5-dimethyl-4-hydroxybenzoic acid, 2,6-dimethyl-4-hydroxybenzoic acid, 2-hydroxy-5-methyl-6-naphthoic acid, 2-hydroxy-5-methoxy-6-naphthoic acid, 3-chloro-4-hydroxybenzoic acid, 2-chloro-4-hydroxybenzoic acid, 2,3-dichloro-4-hydroxybenzoic acid, 3-bromo-4-hydroxybenzoic acid, 2-hydroxy-5-chloro-6-naphthoic acid, 2-hydroxy-7-chloro-6-naphthoic acid, 2-hydroxy-5,7-dichloro-6-naphthoic acid and 4-hydroxy-4'-biphenylcarboxylic acid, alkyl-, alkoxy- or halogen-substituted products thereof, and ester-forming derivatives thereof. Among these compounds, 4-hydroxybenzoic acid and 2-hydroxy-6-naphthoic acid are preferred since properties or melting point of the resulting polymers become easy to control.

Specific examples of the aromatic dicarboxylic acids include aromatic dicarboxylic acids such as terephthalic acid, chloroterephthalic acid, dichloroterephthalic acid, bromoterephthalic acid, methylterephthalic acid, dimethylterephthalic acid, ethylterephthalic acid, methoxyterephthalic acid, ethoxyterephthalic acid, isophthalic acid, 4,4'-biphenyldicarboxylic acid, 3,4'-biphenyldicarboxylic acid, 4,4"-terphenyldicarboxylic acid, 2,6-naphthalenedicarboxylic acid, 2,7-naphthalenedicarboxylic acid, 1,6-naphthalenedicarboxylic acid, diphenyl ether-4,4'-dicarboxylic acid, diphenoxybutane-4,4'-dicarboxylic acid, diphenylethane-4,4'-dicarboxylic acid, diphenyl ether-3,3'-dicarboxylic acid and diphenylethane-3,3'-dicarboxylic acid, alkyl-, alkoxy- or halogen-substituted products thereof, and ester-forming derivatives thereof. Among these compounds, terephthalic acid and 2,6-naphthalenedicarboxylic acid are preferred since mechanical properties, heat resistance, melting point temperature, and formability of the resulting liquid crystal polymers become easy to adjust to an appropriate level.

Specific examples of the aromatic diols include aromatic diols such as hydroquinone, chlorohydroquinone, methylhydroquinone, 1-butylhydroquinone, phenylhydroquinone, methoxyhydroquinone, phenoxyhydroquinone, resorcinol, 4-chlororesorcinol, 4-methylresorcinol, 4,4'-dihydroxybiphenyl, 4,4"-dihydroxyterphenyl, 2,6-naphthalenediol, 1,6-naphthalenediol, 2,7-naphthalenediol, 4,4'-dihydroxydiphenyl ether, bis(4-hydroxyphenoxy)ethane, 3,3'-dihydroxybiphenyl, 3,3'-dihydroxydiphenyl ether and 2,2-bis(4-hydroxyphenyl)methane, alkyl-, alkoxy- or halogen-substituted products thereof, and ester-forming derivatives thereof. Among these compounds, hydroquinone and 4,4'-dihydroxybiphenyl are preferred for reactivity in polymerization and properties of the resulting liquid crystal polymers.

Specific examples of the aromatic hydroxyamines, the aromatic diamines and the aromatic aminocarboxylic acids include aromatic hydroxyamines such as 4-aminophenol, N-methyl-4-aminophenol, 3-aminophenol, 3-methyl-4-aminophenol, 4-amino-1-naphthol, 4-amino-4'-hydroxydiphenyl, 4-amino-4'-hydroxydiphenyl ether, 4-amino-4'-hydroxydiphenylmethane, 4-amino-4'-hydroxydiphenylsulfide and 4,4'-diaminodiphenylsulfone, aromatic diamines such as 1,4-phenylenediamine, N-methyl-1,4-phenylenediamine, N,N'-dimethyl-1,4-phenylenediamine, 4,4'-diaminodiphenylsulfide (thiodianyline), 2,5-diaminotoluene, 4,4'-ethylenedianyline, 4,4'-diaminodiphenoxyethane, 4,4'-diaminodiphenylmethane (methylenedianiline) and 4,4'-diaminodiphenyl ether (oxydianyline), aromatic aminocarboxylic acids such as 4-aminobenzoic acid, 2-amino-6-naphthoic acid and 2-amino-7-naphthoic acid, and ester-forming derivatives thereof.

Unless the objective of the present invention is adversely affected, alicyclic dicarboxylic acids, aliphatic diols, alicyclic diols, aromatic mercaptocarboxylic acids, aromatic dithiol, aromatic mercaptophenols and the like may be copolymerized in a liquid crystal polymer in addition to the aforementioned monomer units.

Specific examples of the alicyclic dicarboxylic acids, the aliphatic diols and the alicyclic diols include linear or branched aliphatic diols such as hexahydroterephthalic acid, trans-1,4-cyclohexanediol, cis-1,4-cyclohexanediol, trans-1,4-cyclohexanedimethanol, cis-1,4-cyclohexanedimethanol, trans-1,3-cyclohexanediol, cis-1,2-cyclohexanediol, trans-1,3-cyclohexanedimethanol, ethylene glycol, 1,3-propanediol, 1,4-butanediol and neopentyl glycol, and ester-forming derivatives thereof.

Specific examples of the aromatic mercaptocarboxylic acids, aromatic dithiols and aromatic mercaptophenols include 4-mercaptobenzoic acid, 2-mercapto-6-naphthoic acid, 2-mercapto-7-naphthoic acid, benzene-1,4-dithiol, benzene-1,3-dithiol, 2,6-naphthalene-dithiol, 2,7-naphthalene-dithiol, 4-mercaptophenol, 3-mercaptophenol, 6-mercaptophenol and 7-mercaptophenol, and ester-forming derivatives thereof.

Specific examples of preferable liquid crystal polymers, for example, include those composed of the monomer constituting units shown below.

4-hydroxybenzoic acid/2-hydroxy-6-naphthoic acid copolymers; 4-hydroxybenzoic acid/terephthalic acid/4,4'-dihydroxybiphenyl copolymers; 4-hydroxybenzoic acid/terephthalic acid/isophthalic acid/4,4'-dihydroxybiphenyl copolymers; 4-hydroxybenzoic acid/terephthalic acid/isophthalic acid/4,4'-dihydroxybiphenyl/hydroquinone copolymers; 4-hydroxybenzoic acid/terephthalic acid/hydroquinone copolymers; 4-hydroxybenzoic acid/2-hydroxy-6-naphthoic acid/terephthalic acid/4,4'-dihydroxybiphenyl copolymers; 4-hydroxybenzoic acid/2-hydroxy-6-naphthoic acid/terephthalic acid/hydroquinone copolymers; 4-hydroxybenzoic acid/2,6-naphthalenedicarboxylic acid/4,4'-dihydroxybiphenyl copolymers; 4-hydroxybenzoic acid/terephthalic acid/2,6-naphthalenedicarboxylic acid/hydroquinone copolymers; 4-hydroxybenzoic acid/2,6-naphthalenedicarboxylic acid/hydroquinone copolymers; 4-hydroxybenzoic acid/2-hydroxy-6-naphthoic acid/2,6-naphthalenedicarboxylic acid/hydroquinone copolymers; 4-hydroxybenzoic acid/terephthalic acid/2,6-naphthalenedicarboxylic acid/hydroquinone/4,4'-dihydroxybiphenyl copolymers; 4-hydroxybenzoic acid/terephthalic acid/4-aminophenol copolymers; 4-hydroxybenzoic acid/terephthalic acid/4,4'-dihydroxybiphenyl/4-aminophenol copolymers; 2-hydroxy-6-naphthoic acid/terephthalic acid/4-aminophenol copolymers; 4-hydroxybenzoic acid/terephthalic acid/2,6-naphthalenedicarboxylic acid/hydroquinone/4,4'-dihydroxybiphenyl copolymers; 4-hydroxybenzoic acid/2-hydroxy-6-naphthoic acid/terephthalic acid/4-aminophenol copolymers; 4-hydroxybenzoic acid/2-hydroxy-6-naphthoic acid/terephthalic acid/4,4'-dihydroxybiphenyl copolymers; 4-aminophenol copolymers; 2-hydroxy-6-naphthoic acid/terephthalic acid/hydroquinone copolymers; 2-hydroxy-6-naphthoic acid/terephthalic acid/4,4'-dihydroxybiphenyl copolymers; 4-hydroxybenzoic acid/terephthalic acid/ethylene glycol copolymers; 4-hydroxybenzoic acid/terephthalic acid/4,4'-dihydroxybiphenyl/ethylene glycol copolymers; 4-hydroxybenzoic acid/2-hydroxy-6-naphthoic acid/terephthalic acid/ethylene glycol copolymers; 4-hydroxybenzoic acid/2-hydroxy-6-naphthoic acid/terephthalic acid/4,4'-dihydroxybiphenyl/ethylene glycol copolymers.

Examples of liquid crystal polymers particularly preferred are those containing at least one polyester selected from the group consisting of 4-hydroxybenzoic acid/2-hydroxy-6-naphthoic acid copolymers, preferably 73% by mol/27% by mol copolymers thereof, 4-hydroxybenzoic acid/2-hydroxy-6-naphthoic acid/hydroquinone/terephthalic acid copolymers, preferably 42% by mol/16% by mol/21% by mol/21% by mol copolymers thereof, 4-hydroxybenzoic acid/2-hydroxy-6-naphthoic acid/hydroquinone/2,6-naphthalenedicarboxylic acid copolymers, preferably 70% by mol/2% by mol/14% by mol/14% by mol copolymers thereof, 2-hydroxy-6-naphthoic acid/4-aminophenol/terephthalic acid copolymers, preferably 60% by mol/20% by mol/20% by mol copolymers thereof, 4-hydroxybenzoic acid/2-hydroxy-6-naphthoic acid/4-aminophenol/4,4'-dihydroxybiphenyl/terephthalic acid copolymers, preferably 60% by mol/4% by mol/4% by mol/14% by mol/16% by mol copolymers thereof, and 4-hydroxybenzoic acid/4,4'-dihydroxybiphenyl/terephthalic acid/isophthalic acid copolymers, preferably 60% by mol/20% by mol/15% by mol/5% by mol copolymers thereof.

There are no particular restrictions on the method for producing the liquid crystal polyester resin. Known polycondensation methods of polyesters in which ester linkages composed of a combination of the aforementioned constituents are formed, specifically, melt acidolysis, slurry polymerization and the like can be used.

The melt acidolysis is a method of causing monomers selected from aromatic hydroxycarboxylic acids, aromatic dicarboxylic acids, aromatic diols, aromatic hydroxyamines, aromatic diamines, aromatic aminocarboxylic acids and the like to react in the absence of heat exchange fluids. The method makes a molten solution of reactants first by heating monomers and subsequently performs the reaction to provide a molten polymer. In this method, vacuum may be applied in the final stage of the condensation in order to make it easy to remove by-produced volatile substances (specifically, acetic acid, water and the like).

The slurry polymerization is a method of causing monomers to react in a heat exchange medium. A polymer is obtained in a state where it is suspended in the heat exchange medium.

In either method of the melt acidolysis or the slurry polymerization, it is preferable that monomers containing a hydroxyl group and/or an amino group in the molecule be introduced to the reaction after being converted to lower fatty acid esters (preferably, acetyl forms) thereof, or that a lower fatty acid anhydride (preferably, acetyl anhydride) be added to the system simultaneously, at the time of the polymerization and then the monomers are caused to react. Preferable lower fatty acids are those having from 2 to 6, preferably from 2 to 4 carbon atoms. In particular, acetic acid is the most preferred.

In either method of the melt acidolysis and the slurry polymerization, a catalyst may, if necessary, be used in the reaction.

Specific examples of the catalyst which is optionally used include organotin compounds such as dialkyltin oxides (e.g., dibutyltin oxide) and diaryltin oxides; organotitanium compounds such as titanium dioxide, antimony trioxide, alkoxytitanium silicate, titanium alkoxide, alkali and alkaline earth metal salts of carboxylic acids (e.g., potassium acetate, sodium acetate and zinc acetate), Lewis acids (e.g., $BF_3$) and gaseous catalysts such as hydrogen halides (e.g., HCl).

The used amount of the catalyst is generally from 0.5 ppm to 20% by weight, preferably from 1 ppm to 10% by weight, based on the weight of the monomers. The liquid crystal polymer to be used in the modification method of the present invention preferably has a melting point, as measured by a differential scanning calorimeter, within the range of from 250 to 400° C., and more preferably within the range of from 270 to 350° C., in view of the heat resistance and formability of the polymer.

Modification is conducted by irradiating the liquid crystal polymer with a femtosecond laser. The liquid crystal polymer which is to be irradiated may be in any form or state. For example, it is preferably in a form of fibers, fine particles, a plate, a film or the like, or in a form of that a solution or melt thereof is formed into a film or fine particles. As the forming method of injection molding, extrusion, spinning and the like may be used. Formed articles obtained by such methods may be of course used as an object to be irradiated.

The irradiation spot diameter of the femtosecond laser is not particularly limited and may be selected appropriately depending upon the size, type of modification, or degree of modification of the desired portion to be modified, and also upon the size, numerical aperture, or magnification of a lens.

For example, it may be selected in a range of not more than 50 µm (preferably, from about 0.1 to about 10 µm) in diameter. In the case of focusing a laser beam by converting it into a linear shape using a cylindrical lens, a line area of about 1 mm in width and about 5 mm in length may be selected, for example.

The femtosecond laser referred to herein is an ultra-short pulse laser having a beam with pulse width of $10^{-12}$ seconds or less. For example, a pulse laser can be used, the beam of which has a pulse width of from $1\times10^{-15}$ sec to $1\times10^{-12}$ sec, preferably from $10\times10^{-15}$ sec to $500\times10^{-15}$ sec, and more preferably from $50\times10^{-15}$ sec to $300\times10^{-15}$ sec.

The femtosecond laser can be obtained, for example, by running and amplifying a laser containing titanium-sapphire crystals as a medium, a fiber laser of erbium- or ytterbium-doped quartz, or a dye laser. The wavelength of the femtosecond laser is appropriately selected from 260 to 800 nm, for example. The frequency of the femtosecond laser is selected, for example, within the range of from 1 Hz to 80 MHz, and usually is from about 10 Hz to about 500 kHz.

The average output power or irradiated energy of the femtosecond laser is not particularly limited, and they may be selected appropriately depending upon the type or condition of the object to be irradiated. It is preferable to adjust the focusing means to be used within the range so that abrasion does not occur in the focused portion of the irradiated object.

For example, in the case of irradiating a liquid crystal polymer in the form of solid film, when a beam is focused to a circular area of about 50 µm in diameter using an objective lens, the average output power is adjusted to from 0.06 to 0.16 mW, and preferably from 0.08 to 0.14 mW. When a laser beam is converted into a linear shape and focused to a line area of about 1 mm in width by about 5 mm in length by use of a cylindrical lens, the average output power is adjusted to from 100 to 800 mW, and preferably from 300 to 700 mW.

In the case of irradiating a liquid crystal polymer in the form of film in a molten state or semi-molten state, when a beam is focused to a circular area of about 50 µm in diameter using an objective lens, the average output power is adjusted within the range so that laser abrasion does not occur. When a beam is converted into a linear shape and focused to a line area of about 1 mm in width and about 5 mm in length by use of a cylindrical lens, the average output power is adjusted to from 30 to 2000 mW, and preferably from 50 to 500 mW.

When the average output power of the femtosecond laser is too low, the modification effect becomes insufficient. If it is too high, laser abrasion accompanied by thermal impact may occur at the irradiation spot of the irradiated object.

The present invention will be described in more detail below with reference to Examples, but the invention is not limited thereto. All amounts in "parts" or the like in the following examples are by weight, unless otherwise stated.

EXAMPLES

Preparation Example

Synthesis of Liquid Crystal Polymer (LCP)

Into a reaction container equipped with a stirring blade and a distillation tube, 256 parts of 4-hydroxybenzoic acid, 129 parts of 2-hydroxy-6-naphthoic acid and 266 parts of acetic anhydride were charged. The mixture was heated from 40° C. to 145° C. over 1 hour in a nitrogen atmosphere and was held at 145° C. for 0.5 hour. Then, the mixture was heated to 325° C. over 7 hours and subsequently was caused to react at 325° C. for 30 minutes, followed by pressure reduction at 325° C. The pressure was reduced down to 100 torr over 90 minutes, followed by a polymerization reaction at 100 torr. When the reaction was continued for 10 minutes, since the stirring torque had reached a predetermined value, the polymerization vessel was closed tightly and the reaction was stopped by increasing the pressure in the polymerization vessel to 0.1 MPa.

Then, a valve provided at the bottom of the polymerization vessel was opened and thereby the content in the polymerization vessel was discharged into the form of strands through a die. The strands were conveyed to a cutter by means of a water-cooling conveyor located directly below the polymerization vessel and then cut into the form of pellets, thereby yielding pellets of a polymer.

Measurement of Melt Viscosity

The viscosity of the synthesized resin at a measuring temperature of 320° C. and a shear rate of $10^3$ $s^{-1}$ was measured using a melt viscosity measuring apparatus ("Capirograph 1A" manufactured by Toyo Seiki Seisaku-sho Co., Ltd.) and a capillary of 0.7 mm in diameter and 10 mm in length. The melt viscosity measured at 320° C. was 22 Pa·s.

Measurement of Crystal Melting Temperature

Using an "Exstar6000" manufactured by Seiko Instruments, Inc., the synthesized resin sample was heated under the conditions from room temperature at a heating rate of 20° C./min and the endothermic peak temperature (Tm1) was measured, and then the sample was held at 330° C. for 10 minutes.

Subsequently, the sample was cooled to room temperature at a cooling rate of 20° C./min and the temperature of the top of the exothermic peak observed in this operation was defined as the crystallization temperature (Tc) of the resin. Moreover, an endothermic peak was observed when the sample was heated again at a heating rate of 20° C./min and the temperature at which the top of the peak was shown was defined as the melting point crystal melting temperature (Tm) of the liquid crystal polyester resin. The crystal melting temperature measured in such a procedure using a differential scanning calorimeter was 280° C.

Example 1

The LCP synthesized in Preparation Example was molded using an injection molding machine ("UH1000-110" manufactured by Nissei Plastic Industrial Co., Ltd.) at a cylinder temperature of 300° C. to yield an LCP plate of 89 mm in length, 54 mm in width and 0.8 mm in thickness.

Using a Ti:sapphire laser (wavelength of 780 nm, average output power of 600 mW, frequency of 200 kHz, pulse width of 200 femtoseconds) manufactured by Coherent Co., a femtosecond laser beam was focused onto the surface of the resulting LCP plate (focused area: circular area of about 50 µm in diameter) through an objective lens with a magnification of 5.

As a result, blue fluorescence (second harmonic generation: SHG) was generated immediately after irradiating and a hole as large as about 10 µm to about 20 µm was formed at an irradiation spot by laser abrasion accompanied by thermal impact. A modified portion was observed around the hole. FIG. 1 is a photograph showing the appearance of the LCP plate to the surface of which a femtosecond laser was irradiated. It becomes possible to establish a process for the production of an organic thin film of a modified liquid crystal polymer by producing fine particles (nano-particles) of a modified liquid crystal polymer by use of this laser abrasion mechanism, and depositing the particles on a surface of a desired material. Use of the process enables to produce new organic electronics materials from liquid crystal polymers and other organic substances.

Example 2

To a Labo Plastomill 100C100 manufactured by Toyo Seiki Seisaku-sho Co., Ltd. equipped with a T die having a die width of 150 mm and a compression ratio of 2.0, which is adjusted to a cylinder temperature and die temperature at 300° C., the LCP synthesized in Preparation Example was charged. Then, a film having a thickness of about 50 µm was obtained while winding it at a winding rate of 3 m/min.

Using an erbium-doped quartz fiber laser (wavelength of 780 nm, average output power of 0.14 mW, frequency of 1 kHz, pulse width of 215 femtoseconds) manufactured by Cyber Laser Co., modification was made to a 6 mm×24 mm area of the LCP film by irradiation with a femtosecond laser at an irradiation rate of 10 µm/pulse (10000 µm/sec).

The sample was subjected to molecular weight distribution measurement by gel permeation chromatography (GPC). FIG. 2 is the spectra showing the results of the GPC measurement of the modified portion and the unmodified portion of the LCP. There is a tendency that the distribution of Curve a, which shows the modified portion, shifts to the direction of molecular weight higher than that of Curve b, which shows the unmodified portion. The results of average molecular weight calculation are shown in Table 1.

TABLE 1

|  | Number average ($Mn/10^4$) | Weight average ($Mw/10^5$) | Z average ($Mz/10^5$) |
|---|---|---|---|
| Unmodified portion | 8.78 | 2.08 | 3.61 |
| Modified portion | 10.10 | 2.11 | 3.64 |

According to the results shown in Table 1, it is expected that the tensile strength, the impact strength, the hardness and the like were improved because the number average molecular weight (Mn) of the modified portion was increased by about 15% than that of the unmodified portion.

Example 3

On a glass substrate, the LCP film obtained in Example 2 (about 12 mm×about 12 mm, about 50 µm in thickness) was placed. It was then heated to about 320° C. (at an initial heating rate of 40° C./min) on a hot stage to form a molten state.

Using an erbium-doped quartz fiber laser (wavelength of 780 nm, frequency of 1 kHz, pulse width of 215 femtoseconds) manufactured by Cyber Laser Co., an ultra-short pulse laser beam was focused onto the surface of the molten LCP film (focused area: circular area of about 50 µm in diameter) through an objective lens with a magnification of 5. The irradiation of the laser was conducted while adjusting the average output power within the range so that laser abrasion does not occur.

When an attempt to measure the molecular weight distribution of the resulting modified LCP by gel permeation chromatography (GPC) was made, the film was changed to a material insoluble in the solvent for the pretreatment (pentafluorophenol).

Solid NMR Measurement

The modified LCP film and the unmodified LCP film were formed into films, which were then subjected to solid NMR measurement.

Measurement conditions are shown in Table 2.

TABLE 2

| Apparatus | "Avance 400" manufactured by Bruker |
|---|---|
| Temperature | Room temperature |
| Standard material | Glycine (external standard, 176.5 ppm) |
| Measured nucleus | 100.6248425 MHz |
| Pulse width | 3.0 µsec. |
| Pulse repeating time | ACQTM 0.0249994 sec. PD = 8 sec. |
| Data point | POINT 1892 SAMPO 1756 |
| Spectrum width | 35211.270 Hz |
| Pulse mode | Hydrogen nucleus T1ρ relaxation time measuring mode |
| Contact time | 2.0 msec. |
| Rotation rate of sample | 12 kHz |

FIG. 3 is a $^{13}$CCP/MAS spectrum of the modified LCP film (at the central portion). FIG. 4 is a 13CCP/MAS spectrum of the unmodified LCP film. In the spectrum of FIG. 3, a peak c having a possibility of showing a crosslinked structure was recognized.

Relaxation Time Measurement

Next, in order to evaluate the presence of crosslinkage, a modified LCP film and an unmodified LCP film were subjected to measurement of the hydrogen nucleus $T_{1\rho}^{H}$ relaxation time, which is considered to reflect molecular motion. The results are shown in Table 3.

TABLE 3

|  | 130 ppm | 125 ppm |
|---|---|---|
| Modified LCP film (central portion) | 15.6 msec. | 17.5 msec. |
| Unmodified LCP film | 14.2 msec. | 12.9 msec. |

From the fact that in comparison between the modified LCP film and the unmodified LCP film, the modified LCP film had a greater value in hydrogen nucleus $T_{1\rho}^{H}$ relaxation time, it is suggested that the molecular mobility of the modified LCP film was reduced and a crosslinked structure was present.

FIG. 5 is a hydrogen nucleus $T_{1\rho}^{H}$ plot of the modified LCP film (at the central portion). FIG. 6 is a hydrogen nucleus $T_{1\rho}^{H}$ plot of the unmodified LCP film.

Approximation of the increasing ratio of the polymerization degree by dividing the average value 16.61 msec of the relaxation times of peaks No. 7 and No. 8 on the spectrum distribution of the modified LCP with the average value 13.55 msec of the relaxation times of peaks No. 3 and No. 4 of the unmodified LCP, shows that the polymerization degree was increased by about 23%.

Measurement of Contact Time Dependency

Furthermore, the modified LCP film and the unmodified LCP film were subjected to measurement of contact time dependency.

The measurement conditions are shown in Table 4.

TABLE 4

| Apparatus | "Avance 400" manufactured by Bruker |
|---|---|

TABLE 4-continued

| | |
|---|---|
| Temperature | Room temperature |
| Standard material | Glycine (external standard, 176.5 ppm) |
| Measured nucleus | 100.6248425 MHz |
| Pulse width | 3.0 μsec. |
| Pulse repeating time | ACQTM 0.0249994 sec. PD = 8 sec. |
| Data point | POINT 1892 SAMPO 1756 |
| Spectrum width | 35211.270 Hz |
| Pulse mode | cp measurement mode |
| Contact time | 3.0 msec. (1 μsec., 5 μsec., 10 μsec., 14 μsec., 16 μsec., 20 μsec., 40 μsec., 60 μsec., 80 μsec., 100 μsec., 500 μsec., 1 msec., 1.5 msec., 2 msec., 3 msec., 4 msec., 5 msec.) |
| Rotation rate of sample | 12 kHz |

FIG. 7 is a contact time dependency plot (130 ppm) of a modified LCP film (at the central portion). FIG. 8 is a contact time dependency plot (130 ppm) of an unmodified LCP film. According to these plots, the time constant of the contact time of the modified LCP film and that of the unmodified LCP film are 22.8 msec and 75 msec, respectively. That is, the modified LCP film has a smaller time constant than the unmodified LCP film. This means that a crosslinked structure is present in the modified LCP film.

From the results of analyses, which are shown above, it is conceivable that the modified LCP has a crosslinked structure and consequently has an increased polymerization degree and is improved in tensile strength, elastic modulus, impact strength, hardness and the like in comparison to the unmodified LCP.

Example 4

On a glass substrate provided thereon with an aluminum foil for preventing adhesion, five pieces of the LCP film obtained in Example 2 (about 10 mm in width×about 40 mm in length, about 50 μm in thickness) were piled one on another. They were heated to about 380° C. on a hot stage to form a molten state.

Using a Ti:sapphire laser (wavelength of 780 nm, average output power of 50 mW to 500 mW, frequency of 200 kHz, pulse width of 150 femtoseconds) manufactured by Coherent Co., an ultra-short pulse laser beam was converted into a linear shape by use of a cylindrical lens and was focused onto the surface of the molten LCP film (focused area: line area of about 1 mm in width by about 5 mm in length).

The irradiation of the laser was conducted by arranging the LCP film against a light source with the longitudinal direction of the LCP film intersecting almost at right angles the longitudinal direction of the focused portion, and subsequently moving the LCP film with respect to the light source so that the entire surface of the LCP film could be scanned once by the focused portion. The average output power of the ultra-short pulse laser was varied to 50 mW, 100 mW, 300 mW and 500 mW for respective samples.

The respective films after irradiating were subjected to a tensile test and thereby an initial Young's modulus and a breaking strength were measured. The test conditions are shown in Table 5. Measurement results are shown in Table 6.

TABLE 5

| | |
|---|---|
| Tensile tester | "RTM-500" manufactured by Orientec Corporation |
| Jig-to-jig distance | About 15 mm |
| Tensile rate | 5 mm/min |

TABLE 6

| | Average output power (mW) | | | | |
|---|---|---|---|---|---|
| | 0 | 50 | 100 | 300 | 500 |
| Initial Young's modulus (MPa) | 840.8 | 1225.6 | 1948.5 | 1461.1 | 1947.2 |
| Breaking strength (MPa) | 28.5 | 36.1 | 57.8 | 30.7 | 48.3 |

FIG. 9 is a graph showing the initial Young's modulus plotted against the irradiation strength (average output power). FIG. 10 is a graph showing the breaking strength plotted against the irradiation strength. These graphs show a tendency that the initial Young's modulus and the breaking strength increase as the irradiation strength is increased.

Based on this result, it is conceivable that in a spinning process of liquid crystal polymer fiberization, irradiating polymer in a molten state before being extruded through a spinning nozzle or irradiating fibers in a molten or semi-molten state after being extruded from the nozzle outlet, with an ultra short pulse laser in optimized irradiation conditions, increases polymerization degree and improves physical strength through utilization of the nonthermal photochemical reaction. This method is advantageous in that it does not require a process for increasing polymerization degree by performing solid phase polymerization with heat treatment after spinning, that is, a high-temperature treating process under vacuum as in the conventional methods.

The modified liquid crystal polymer fibers have a possibility to show improvement in tensile breaking strength and initial Young's modulus and also in bending strength and compressive elastic modulus. As applications of fibers having been improved in this property, for example, use of such fibers instead of steel cords to be used in carcass materials of radial tires for passenger cars, light trucks, and especially large trucks and buses, makes it possible to further reduce weight of the tires and accordingly improve performance and also improve durability (bending fatigue resistance).

Moreover, in a film forming process of liquid crystal polymer filming, it is conceivable that physical strength and strength uniformity in both the longitudinal direction and the transverse direction (the machine direction (MD) and the direction perpendicular thereto (TD)) are improved by optimally irradiating polymer in a molten state before being extruded through the die or irradiating a film in a molten or semi-molten state after being extruded from the die outlet. Furthermore, this modification method has a possibility of imparting to conventional liquid crystal polymer films a property of hardly allowing electromagnetic waves with a high frequency of terahertz ($10^{12}$ Hertz) range to pass therethrough, it is expected to produce new heat-resistant films excellent in high-frequency dielectric characteristics (low dielectric loss).

In addition, instead of utilizing a photochemical reaction caused by the ultra-short pulse laser, if a similar modification effect can be obtained by irradiating with optimally designed other types of laser or light source, it is conceivable that the photoconversion efficiency in the modification is further improved.

Example 5

Using a Ti:sapphire laser (wavelength of 780 nm, frequency of 200 kHz, pulse width of 150 femtoseconds, average output power of 500 mW) manufactured by Coherent Co., an ultra-short pulse laser beam was converted into a linear shape by use of a cylindrical lens and was focused (focused area: line area of about 1 mm in width by about 5 mm in length) onto a surface of the LCP film obtained in Example 2 (about 10 mm in width, about 40 mm in length, and about 50 μm in thickness).

The irradiation of the laser was conducted by arranging the LCP film against a light source with the longitudinal direction of the LCP film intersecting almost at right angles the longitudinal direction of the focused portion, and subsequently moving the LCP film with respect to the light source so that the entire surface of the LCP film could be scanned once by the focused portion.

Using a terahertz analyzer ("pulse IRS 2004" manufactured by Advanced Infrared Spectroscopy Co., Ltd.), a terahertz (THz) spectrum of the film after irradiating was measured.

FIG. 11 is a spectrum which shows the result of performing a terahertz spectral measurement of the LCP film before irradiating. FIG. 12 is a spectrum which shows the result of performing a terahertz spectral measurement of the LCP film after irradiating. FIG. 13 is a spectrum which shows the difference produced by subtracting the spectrum of the LCP film before irradiating from the spectrum of the film after irradiating.

From the spectrum shown in FIG. 13, it was recognized that the film after irradiating had a transmittance of terahertz electromagnetic waves, which was lower than that of the film before irradiating. One of the causes by which the transmittance of electromagnetic waves decreased is considered that a crosslinked structure was formed between polymer molecules. This polymer is promising for applications in terahertz electromagnetic shielding materials or photonics materials.

Moreover, since the modification method of the present invention has a possibility of imparting to conventional liquid crystal polymer films a property of hardly allowing electromagnetic waves with a high frequency of terahertz (1012 Hertz) range to pass therethrough, the method is conceivable to be able to provide heat-resistant films excellent in high-frequency dielectric characteristics (low dielectric loss).

BRIEF DESCRIPTION OF THE DRAWINGS

FIG. 1 is a photograph showing the appearance of an LCP plate to the surface of which a femtosecond laser was irradiated.

FIG. 2 is spectra showing the results of the GPC measurement of a modified portion and an unmodified portion of an LCP.

FIG. 3 is a $^{13}$CCP/MAS spectrum of a modified LCP film (at the central portion).

FIG. 4 is a $^{13}$CCP/MAS spectrum of an unmodified LCP film.

FIG. 5 is a hydrogen nucleus $T_{1\rho}^{H}$ plot of a modified LCP film (central portion).

FIG. 6 is a hydrogen nucleus $T_{1\rho}^{H}$ plot of an unmodified LCP film.

FIG. 7 is a contact time dependency plot (130 ppm) of a modified LCP film (central portion).

FIG. 8 is a contact time dependency plot (130 ppm) of an unmodified LCP film.

FIG. 9 is a graph showing the initial Young's modulus plotted against the irradiation strength in a tensile test of an LCP film.

FIG. 10 is a graph showing the breaking strength plotted against the irradiation strength in a tensile test of an LCP film.

FIG. 11 is a spectrum which shows the result of performing a terahertz spectral measurement of an LCP film before irradiating.

FIG. 12 is a spectrum which shows the result of performing a terahertz spectral measurement of an LCP film after irradiating.

FIG. 13 is a spectrum which shows the difference produced by subtracting the spectrum of the LCP film before irradiating from the, spectrum of the film after irradiating.

The invention claimed is:

1. A method of modifying liquid crystal polymers, which comprises a step of irradiating liquid crystal polymer with the laser beam having a pulse width of $10^{-12}$ seconds or less, wherein average output power of the laser beam is adjusted within the range so that abrasion does not occur in the focused portion of the irradiated object, and
the modification effects comprise decreasing transmittance of terahertz ($10^{12}$ Hertz) electromagnetic waves.

2. The method according to claim 1, wherein the liquid crystal polymer comprises at least one kind of polyester selected from the group consisting of
a copolymer of 73% by mol of 4-hydroxybenzoic acid/ 27% by mol of 2-hydroxy-6-naphthoic acid;
a copolymer of 42% by mol of 4-hydroxybenzoic acid/6% by mol of 2-hydroxy-6-naphthoic acid/21% by mol of hydroquinone/21% by mol of terephthalic acid;
a copolymer of 70% by mol of 4-hydroxybenzoic acid/2% by mol of 2-hydroxy-6-naphthoic acid/14% by mol of hydroquinone/14% by mol of 2,6-naphthalenedicarboxylic acid;
a copolymer of 60% by mol 2-hydroxy-6-naphthoic acid/ 20% by mol of 4-aminophenol/20% by mol of terephthalic acid;
a copolymer of 60% by mol of 4-hydroxybenzoic acid/4% by mol of 2-hydroxy-6-naphthoic acid/4% by mol of 4-aminophenol/14% by mol of 4,4'-dihydroxybiphenyl/ 16% by mol of terephthalic acid; and
a copolymer of 60% by mol of 4-hydroxybenzoic acid/ 20% by mol of 4,4'-dihydroxybiphenyl/15% by mol of terephthalic acid/5% by mol of isophthalic acid.

3. A method of modifying liquid crystal polymers, which comprises a step of irradiating a thermotropic liquid crystal polymer with the laser beam having a pulse width of $10^{-12}$ seconds or less, wherein average output power of the laser beam is adjusted within the range so that abrasion does not occur in the focused portion of the irradiated object, and the modification effects comprise decreasing transmittance of terahertz ($10^{12}$ Hertz) electromagnetic waves.

4. The method according to claim 3, wherein the liquid crystal polymer comprises at least one kind of polyester selected from the group consisting of
a copolymer of 73% by mol of 4-hydroxybenzoic acid/ 27% by mol of 2-hydroxy-6-naphthoic acid;
a copolymer of 42% by mol of 4-hydroxybenzoic acid/6% by mol of 2-hydroxy-6-naphthoic acid/21% by mol of hydroquinone/2 1% by mol of terephthalic acid;
a copolymer of 70% by mol of 4-hydroxybenzoic acid/2% by mol of 2-hydroxy-6-naphthoic acid/14% by mol of hydroquinone/14% by mol of 2,6-naphthalenedicarboxylic acid;
a copolymer of 60% by mol 2-hydroxy-6-naphthoic acid/ 20% by mol of 4-aminophenol/20% by mol of terephthalic acid;
a copolymer of 60% by mol of 4-hydroxybenzoic acid/4% by mol of 2-hydroxy-6-naphthoic acid/4% by mol of 4-aminophenol/14% by mol of 4,4'-dihydroxybiphenyl/ 16% by mol of terephthalic acid; and a copolymer of 60% by mol of 4-hydroxybenzoic acid/ 20% by mol of 4,4'-dihydroxybiphenyl/15% by mol of terephthalic acid/5% by mol of isophthalic acid.

5. A method of modifying liquid crystal polymers, which comprises a step of forming a solid film of a thermotropic liquid crystal polymer, and a step of irradiating the solid film with the laser beam having a pulse width of $10^{-12}$ seconds or less, wherein average output power of the laser beam is adjusted within the range so that abrasion does not occur in the focused portion of the irradiated object, and the modification effects comprise decreasing transmittance of terahertz ($10^{12}$ Hertz) electromagnetic waves.

6. The method of modifying liquid crystal polymers according to claim 5, wherein average output power of the laser beam is adjusted to 100 to 800 mW when the laser beam is converted into a linear shape with a cylindrical lens and focused to a line area of about 1 mm in width and about 5 mm in length.

7. The method according to claim 5, wherein the liquid crystal polymer comprises at least one kind of polyester selected from the group consisting of a copolymer of 73% by mol of 4-hydroxybenzoic acid/ 27% by mol of 2-hydroxy-6-naphthoic acid;

a copolymer of 42% by mol of 4-hydroxybenzoic acid/ 16% by mol of 2-hydroxy-6-naphthoic acid/21% by mol of hydroquinone/2 1% by mol of terephthalic acid;

a copolymer of 70% by mol of 4-hydroxybenzoic acid/2% by mol of 2-hydroxy-6-naphthoic acid/14% by mol of hydroquinone/14% by mol of 2,6-naphthalenedicarboxylic acid;

a copolymer of 60% by mol 2-hydroxy-6-naphthoic acid/ 20% by mol of 4-aminophenol/20% by mol of terephthalic acid;

a copolymer of 60% by mol of 4-hydroxybenzoic acid/4% by mol of 2-hydroxy-6-naphthoic acid/14% by mol of 4-aminophenol/14% by mol of 4,4'-dihydroxybiphenyl/ 16% by mol of terephthalic acid; and a copolymer of 60% by mol of 4-hydroxybenzoic acid/ 20% by mol of 4,4'-dihydroxybiphenyl/15% by mol of terephthalic acid/5% by mol of isophthalic acid.

8. A method of modifying liquid crystal polymers, which comprises a step of forming a melt or a molten state of a thermotropic liquid crystal polymer, and a step of irradiating the melt or the molten state with the laser beam having a pulse width of $10^{-12}$ seconds or less.

9. The method according to claim 8, wherein the liquid crystal polymer comprises at least one kind of polyester selected from the group consisting of a copolymer of 73% by mol of 4-hydroxybenzoic acid/ 27% by mol of 2-hydroxy-6-naphthoic acid;

a copolymer of 42% by mol of 4-hydroxybenzoic acid/ 16% by mol of 2-hydroxy-6-naphthoic acid/21% by mol of hydroquinone/21% by mol of terephthalic acid;

a copolymer of 70% by mol of 4-hydroxybenzoic acid/2% by mol of 2-hydroxy-6-naphthoic acid/14% by mol of hydroquinone/14% by mol of 2,6-naphthalenedicarboxylic acid;

a copolymer of 60% by mol 2-hydroxy-6-naphthoic acid/ 20% by mol of 4-aminophenol/20% by mol of terephthalic acid;

a copolymer of 60% by mol of 4-hydroxybenzoic acid/4% by mol of 2-hydroxy-6-naphthoic acid/4% by mol of 4-aminophenol/14% by mol of 4,4'-dihydroxybiphenyl/ 16% by mol of terephthalic acid; and a copolymer of 60% by mol of 4-hydroxybenzoic acid/ 20% by mol of 4,4'-dihydroxybiphenyl/15% by mol of terephthalic acid/5% by mol of isophthalic acid.

10. The method of modifying liquid crystal polymers according to claim 8, wherein average output power of the laser beam is adjusted to 30 to 2000 mW when the laser beam is converted into a linear shape with a cylindrical lens and focused to a line area of about 1 mm in width and about 5 mm in length.

11. A modified liquid crystal polymer obtained by the method according to claim 1.

12. A modified liquid crystal polymer obtained by the method according to claim 3.

13. A modified liquid crystal polymer obtained by the method according to claim 5.

14. A modified liquid crystal polymer obtained by the method according to claim 8.

15. A modified liquid crystal polymer obtained by the method according to claim 2.

16. A modified liquid crystal polymer obtained by the method according to claim 4.

17. A modified liquid crystal polymer obtained by the method according to claim 7.

18. A modified liquid crystal polymer obtained by the method according to claim 9.

* * * * *